United States Patent
Lowenstein et al.

[11] Patent Number: 6,079,481
[45] Date of Patent: Jun. 27, 2000

[54] THERMAL STORAGE SYSTEM

[75] Inventors: Andrew Lowenstein; Marc J. Sibilia, both of Princeton; Jonathan D. Douglas, Lawrenceville; Thomas S. Tonon, Princeton, all of N.J.

[73] Assignee: AIL Research, Inc, Princeton, N.J.

[21] Appl. No.: 09/008,823

[22] Filed: Jan. 20, 1998

Related U.S. Application Data

[60] Provisional application No. 60/035,922, Jan. 23, 1997.

[51] Int. Cl.[7] ........................................... F28D 17/00
[52] U.S. Cl. .............................. 165/10; 165/168; 165/183
[58] Field of Search ............................. 165/10, 104.14, 165/168, 183; 62/430, 59, 260, 434

[56] References Cited

U.S. PATENT DOCUMENTS

| | | | |
|---|---|---|---|
| 4,011,736 | 3/1977 | Harrison | 62/260 |
| 4,287,942 | 9/1981 | Whitman | 165/104.14 |
| 4,347,892 | 9/1982 | Clyne et al. | 165/10 |
| 4,362,207 | 12/1982 | Farfaletti-Casali et al. | 165/10 A |
| 4,491,172 | 1/1985 | Hitchin | 165/10 A |
| 4,565,242 | 1/1986 | Yano et al. | 165/10 |
| 4,738,303 | 4/1988 | Lampe et al. | 165/10 |
| 4,954,278 | 9/1990 | MacCracken et al. | 165/10 A |
| 5,036,904 | 8/1991 | Kanada et al. | 165/10 A |
| 5,143,148 | 9/1992 | Merryfull | 165/10 |
| 5,184,669 | 2/1993 | Tamme et al. | 165/10 |
| 5,239,839 | 8/1993 | James | 165/10 A |
| 5,314,006 | 5/1994 | Kaastra et al. | 165/10 |
| 5,638,900 | 6/1997 | Lowenstein et al. | 165/168 |

*Primary Examiner*—Ira S. Lazarus
*Assistant Examiner*—Terrell McKinnon
*Attorney, Agent, or Firm*—Watov & Kipnes, P.C.; Allen R. Kipnes

[57] ABSTRACT

The present invention is directed to a thermal storage system and auxiliary air conditioning systems employing the same, said system employs a heat exchange assembly made from profile board or corrugated board which provides a cost efficient and light weight device for storing an energy storing medium and then using the same at desirable times to provide cooling.

23 Claims, 11 Drawing Sheets

THERMAL STORAGE SYSTEM

RELATED APPLICATION

The present application claims the priority benefits of U.S. Provisional patent application Ser. No. 60/035,922 filed Jan. 23, 1997.

FIELD OF THE INVENTION

The present invention is generally related to a thermal storage system that can be used as part of a building's cooling and/or heating system that produces either a cold or a hot storage medium (e.g. ice, chilled water, phase-change medium, hot water) during off-peak hours and then uses the stored energy to heat or cool the building during peak hours. The thermal storage system employs a heat exchanger assembly, utilizing channeled plates, which may be flat or curvilinear, for directing the flow of a heat transfer fluid from an inlet through the plates to an outlet. This construction employs lower cost materials and provides more efficient heat transfer between the heat transfer fluid and the energy storage medium than existing systems.

BACKGROUND OF THE INVENTION

Large and small buildings utilize a tremendous amount of power to heat and cool their respective spaces. Furthermore, this power is usually consumed coincident with the need for heating and cooling within the building. Since most buildings within a utility's service territory will experience peak demands for heating or cooling at the same time, the resources of the utility supplying power are taxed to their limits at these times and are frequently exceeded. This results in brownouts and, in extreme cases, power outages. Clearly, more effective and lower cost alternatives for power demand planning are needed.

In response to this problem, thermal storage systems were developed. These systems, which generally are limited to larger buildings, allow the building's heating or cooling system to be run at off-peak hours. The thermal energy that is produced is saved in the thermal storage system and then used to heat or cool the building during on-peak hours. In other words, thermal storage systems shift power consumption from peak periods to those times when power demand is considerably less as exemplified by Duh, U.S. Pat. No. 5,237,746; Foley, U.S. Pat. No. 4,827,735; Mauer et al., U.S. Pat. No. 5,369,964; MacCracken, U.S. Pat. No. 4,403,645; Schrader, U.S. Pat. No. 4,609,036 and Telkes, U.S. Pat. No. 2,936,741, each of which is incorporated herein by reference.

For a building owner, the only incentive to install a thermal storage system is to reduce utility bills. This can happen since it is often less expensive to purchase power during off-peak periods. Also, by operating heating or cooling periods at lower power but for longer periods of time, as made possible by the use of a thermal storage system, monthly electrical demand charge (i.e., charge for the peak kilowatts drawn during the month) can be reduced. Unfortunately, for a large majority of building owners, the payback for thermal storage systems currently available does not justify the investment.

The most popular thermal storage system for all but the largest buildings are those that build ice on the surface of a plastic heat exchanger. Such systems typically comprise coils or loops of plastic tubing containing a heat transfer fluid that is used to freeze water or other cooling medium as the cold store. The plastic tubing that is used in these systems must have a relatively thick wall (e.g. 0.062") so that (1) the tubing will not collapse during assembly of the heat exchanger, (2) the tubing can be securely joined to the inlet and outlet manifolds, and (3) the tubing will not burst under the pressure of the heat transfer fluid. The relatively thick walls of the plastic tubes increases the weight and the cost of such thermal storage systems.

Thermal energy storage systems that build ice on the walls of a tubular heat exchanger also suffer a performance penalty when discharging the system. When these systems are discharged the ice melts outwardly from the tube. This forms a small annular ring of water that surrounds the tube. Since water has a low thermal conductivity and since the water in this annulus is almost completely stagnant (i.e., there is very little convective heat transfer), heat transfer is impeded between the ice and the heat transfer fluid that flows within the heat exchanger. Because of this, in many applications, a thermal storage system that builds ice on a tubular heat exchanger cannot be discharged at a rate that is sufficient to meet the cooling requirements of a building unless excess storage capacity is installed or mechanical agitation is added. This further increases the costs, weight and space requirements of the thermal storage system.

Thermal energy storage systems that use ice are not currently available in small sizes. Storage modules have capacities typically in the range of from about 60 to 200 ton-hours. They most commonly are applied on commercial buildings where the onpeak period when they must provide cooling is 10 hours or greater.

The typical module sizes for thermal storage systems that make ice are much more than would be needed by a residence (which needs about 25 ton-hours). They are also much too large for a commercial building that needs to defer the operation of its cooling system for only one or two hours. While this is not currently a common need, the implementation of "real time" pricing could create a need. Under "real time" pricing, the market forces of supply and demand set the price for electricity for each hour of the day. Under this pricing scheme, extremely high electric rates could occur for one or two hours each day during the cooling season.

Under "real time" pricing, a small thermal storage system that could provide cooling during the few hours when electric rates were extremely high might provide the most economic benefits. Unfortunately, the ice storage systems that are now on the market are difficult to scale to smaller sizes.

It would therefore be a significant advance in the art of thermal storage systems to provide a compact, light weight, and low cost system that can store heat or cooling during off-peak hours, that can be scaled to smaller sizes, and that can be rapidly discharged to use the stored energy to heat or cool the building during peak demand hours.

SUMMARY OF THE INVENTION

The present invention is directed to a thermal storage system which is cost effective through the use of low cost materials which can be charged and discharged at high heat transfer rates, and can be scaled to smaller sizes than employed in large buildings. In particular, the present invention is directed to a thermal storage system comprising:

a) a container;

b) at least one plate within the container, each plate having a length and width greater than the thickness thereof and having a plurality of internal channels therein for the flow of a heat transfer fluid in a first plane;

c) at least one inlet and outlet on each plate for the heat transfer fluid, said inlet and outlet being either parallel to or angled with respect to the first plane;

d) conduits connecting the inlets of neighboring plates and the outlets of neighboring plates to enable the heat transfer fluid to travel in parallel paths through said plates; and e) an energy storage medium within the container adapted to exchange energy with the heat transfer fluid flowing within the plates.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to a thermal storage system which either heats or cools an energy storage medium during off peak hours and employs the stored energy therefrom to provide heating or cooling during peak hours. The thermal storage system employs a heat exchange assembly constructed of low cost, light weight materials and configured to provide efficient energy transfer with the energy storage medium.

The heat exchange assembly provides for a heat transfer fluid flowing through at least one plate having one or more internal channels via an internal manifold. The plate can be any shape including square, rectangular, circular, polygonal and the like. The heat transfer fluid flowing within the plates is isolated from an energy storage medium in heat exchange relationship therewith. The manifold and channels formed in the plate are preferably made from profile board, corrugated board, tube sheets or thermoformed sheets and therefore can be made from low cost corrosion resistant materials such as plastics.

As used herein, the term "profile board" shall mean an extrusion, preferably plastic, that is constructed as a double walled sheet, the walls being separated by a series of ribs or webs, preferably uniformly spaced, which run the full length of the sheet. The spacing between the ribs creates the plurality of channels referred to herein. An example of the construction of profile board is disclosed in U.S. Pat. No. 4,898,153, incorporated herein by reference.

As used herein, the term "corrugated board" shall mean an assembly generally comprising three thin plates, two of which are essentially flat and form the outer surfaces of the board, and a third plate which is not flat. The third plate is typically folded, molded or otherwise formed so that when it is inserted between the first two plates, it maintains the outer plates parallel to each other while forming flow channels therebetween that run the full length of the board. The three thin plates can be glued or fused together at their points of contact to form a more rigid structure.

As used herein, the term "tube sheet" shall mean an extrusion, preferably plastic, that is constructed of multiple tubes, each with a circular cross section, that are joined along their length.

The walls of the plates used in the present invention are very thin compared to the walls of plastic tubing used in current thermal storage systems. The walls of the plates will typically be no more than about 30 mils thick, preferably in the range of from about 6 mils to 20 mils, compared to 62 mils for typical plastic tubing. It is practical to use a plate with walls that are much thinner than those of the tubes now used in thermal storage systems because (1) the plate forms a more rigid structure than an individual tube, and (2) the passages within the plates can have a much smaller cross-flow dimension than would be practical for individual tubes, which allows the passages within the plate to withstand larger pressures without bursting.

Figure 1:
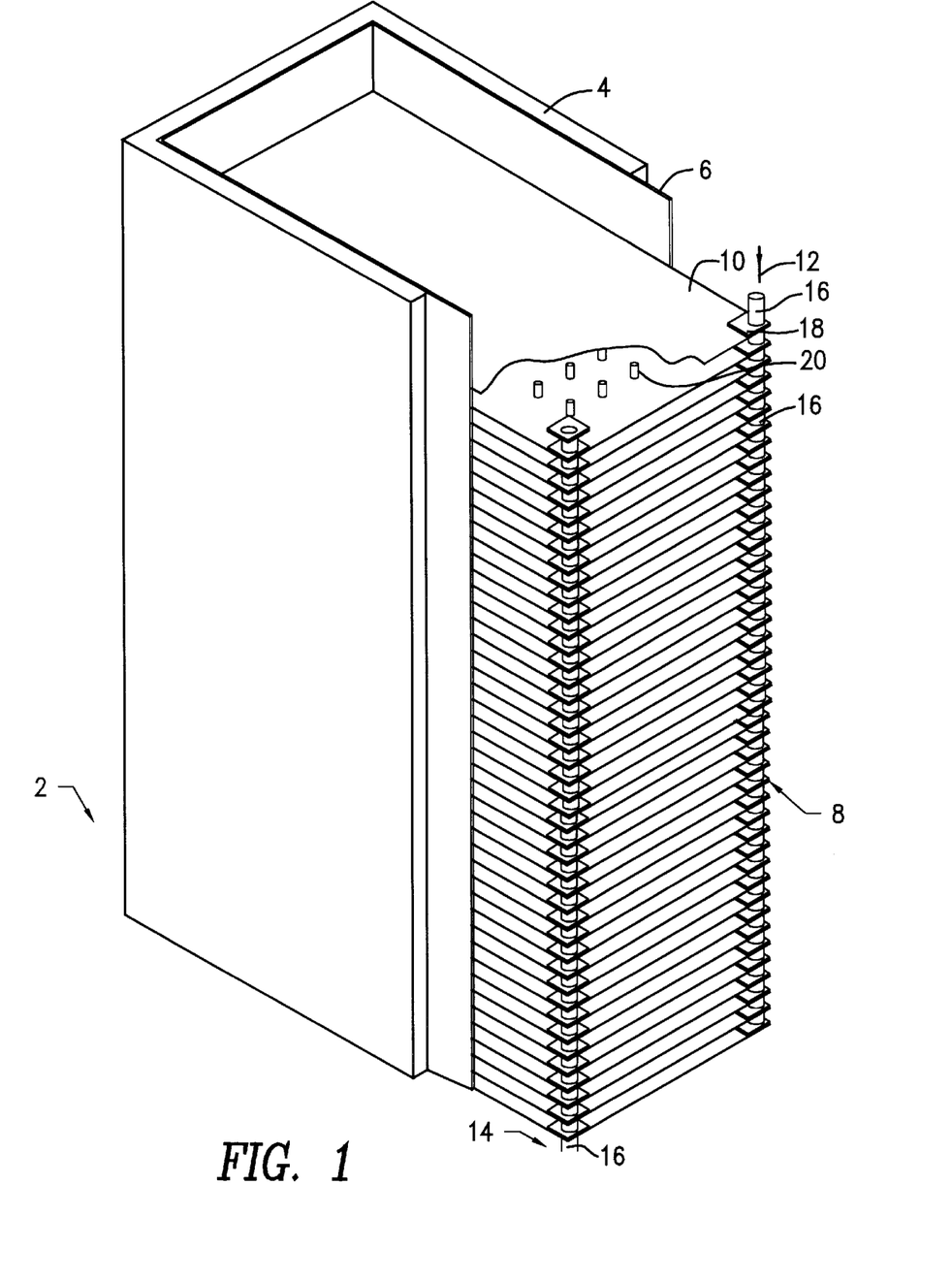
FIG. 1 is a partial perspective view of an embodiment of a thermal storage system in accordance with the present invention.

Referring to the drawings and particular to FIG. 1, there is shown a thermal storage system 2 comprised of an insulated housing 4 surrounding a container 6 in which is a heat exchange assembly 8. The heat exchange assembly 8 includes a plurality of hollow, rectilinear plates 10 which provide a flow path for a heat transfer fluid as described hereinafter. The plates 10 are spaced apart in a generally horizontal orientation. Spacers 20, shown in FIG. 1 as small cylinders with a height that equals the space between the plates, are positioned in a regular pattern between the plates to space the plates apart from each other, preferably equally distant apart.

Access to the plates 10 is through an inlet 12 and an outlet 14. The inlet 12 and outlet 14 are comprised of respective tubes 16; at least some of which are submerged or within the storage medium, in flow path communication with the plates 10. In order to maintain approximately equal flow of heat transfer fluid through each plate, it is preferable to attach the inlet 12 to a plate that is at one end of the heat exchange assembly and the outlet 14 to a plate that is at the opposite end of the heat exchange assembly.

The container 6 holding the heat exchange assembly 8 also is filled with an energy storage medium such as water or another material (e.g. a eutectic salt mixture) that can store energy by changing its phase (e.g., changing from a liquid to a solid). This energy storage medium is in intimate contact with the heat exchanger assembly 8. A heat transfer fluid (e.g., ethylene glycol) is pumped into the inlet 12 and distributed through the plates 10 via the tubes 16.

During the cooling season when the thermal storage system is being charged, the heat transfer fluid is cooled by the building's cooling system to a temperature that is lower than that of the energy storage medium. The heat transfer fluid then flows through the heat exchange assembly 8 that is part of the thermal storage system, and heat is transferred from the energy storage medium to the heat transfer fluid. When the thermal storage system is used to cool the building, warm heat transfer fluid is chilled by flowing it through the heat exchanger assembly 8 where heat is transferred from the heat transfer fluid to the energy storage medium. The chilled heat transfer fluid is then used to cool the building.

The operation of the thermal storage system during the heating season is similar to its operation during the cooling season, but with the obvious changes in the relationship between the heat transfer fluid and the energy storage medium.

When the thermal storage medium is water and the heat transfer fluid is chilled to below 32° F. when the system is being charged, ice will form on the plates 10 of the heat exchange assembly 8. When the system is fully charged, almost all of the water will be converted to ice.

During the discharging of this system to cool the building, a warm heat transfer fluid will flow through the heat exchange assembly 8. The heat transfer fluid will be cooled as heat is transferred from the heat transfer fluid to the ice, and the ice will melt. Since the flow passages within the plates 10 extend the full length of the plate, the ice will first melt in a thin layer over the entire surface of the plate. As discharging proceeds, more ice melts. The ice that remains forms individual planar slabs that are free to move between the plates of the heat exchange assembly.

If the plates are oriented horizontally, which is the preferred orientation when water and ice are the thermal storage medium, the buoyancy force on the planar slabs of ice will push them upward. All of the planar ice slabs, except the one that forms on the upward facing side of the topmost plate, will therefore be pushed upward against the bottom of the respective plates 10 of the heat exchange assembly 8. Since ice is a much better conductor of heat than is water (the thermal conductivity of ice is about four times higher than that of water), the movement of the planar ice slabs upward so that they make contact with the bottom of the plates greatly enhances heat transfer between the ice and the heat transfer fluid that is flowing within the plates. This enhanced heat transfer more than compensates for the lower heat transfer that is caused by the larger water gaps that form between the planar ice slabs and the top of the plates when the slabs move upward. Therefore, a thermal storage system in which ice forms on horizontal or near-horizontal flat plates can provide cooling at a significantly higher rate than conventional thermal storage systems that have the same amount of heat exchanger area but use heat exchange assemblies made from separate tubes, since in these conventional thermal storage systems an annulus of low thermal conductivity water forms around the tubes.

It is important that the spacers 20 that maintain the plates a fixed distance apart do not prevent the planar ice slabs from moving upward as the ice melts. To meet this requirement, the spacers 20 can be designed so that they (1) are good heat conductors, and (2) have a constant cross sectional shape. The spacers 20 should be good heat conductors so that the ice that forms around them during the charging cycle will melt early in the discharge cycle due to heat conduction from the plates 10 which are in contact with the spacers 20. The spacers 20 should have a constant cross sectional shape so that the planar ice slabs that surround the spacers can freely slide upward. The cylindrical spacers 20 that are shown in FIG. 1 are one of many different shapes that meet these requirements.

A possible impediment to heat transfer that may be caused by the presence of air bubbles under the horizontal plates can be eliminated by several means that prevent air bubbles from collecting on the bottom surfaces of the plates 10. In general, it is not possible to fill the storage container 6 with water in a way that purges all the air out of the storage container. This is because a significant amount of air will usually be dissolved in the water. This air will come out of solution and form bubbles when either the temperature of the water increases or the water freezes. Thus, a preferred thermal storage system reduces the presence of air bubbles under the plates. This can most easily be done by either slightly tilting the plates so that they are not horizontal or by slightly curving the plates and positioning them within the storage container 6 with their convex sides pointing downward. Although air bubbles may be initially trapped under a tilted or curved plate, held in place by surface tension, they will move towards the higher edge of the plate as the thermal storage system is repeatedly charged and discharged. It has been observed that air bubbles move even under flat, horizontal plates as the water freezes and melts.

The use of either tilted or curved plates 10 in a thermal storage system is helpful in eliminating trapped air under the plates. The heat exchanger assembly 8 may also include edges of the plates 10 which are not in contact with the walls of the container 6 around their entire periphery. It is estimated that a gap of between ⅛ and ¼" between the edge of the plates and the container will permit any air bubbles that may be present to freely float upward towards the free surface of the water within the storage container 6. If the tilted or curved plates direct air bubbles towards one edge or a portion of one edge of the plates, or towards a corner, then a cap is required only at this edge or portion of the edge, or corner.

It is important that the gap between the edge of the plates and the container not be too large. The ice that forms in this gap during the charging of the thermal storage system connects the planar slabs of ice that form between the plates. If the gap is much larger than approximately one-fourth the plate spacing, the ice that forms in the gap will not melt until late in the discharge cycle. Thus, the ice in the gap will connect what otherwise would be independent and mobile planar slabs of ice and can prevent them from freely moving upward. It may be beneficial to either tilt or curve the plates so that air bubbles are directed towards the corners of the plates that have the inlet 12 for the heat transfer fluid. Since during the discharge cycle, the warm heat transfer fluid first melts the ice in the vicinity of the inlet 12, ice that formed in the gap between the plates and the container would be quickly melted.

Figure 8:
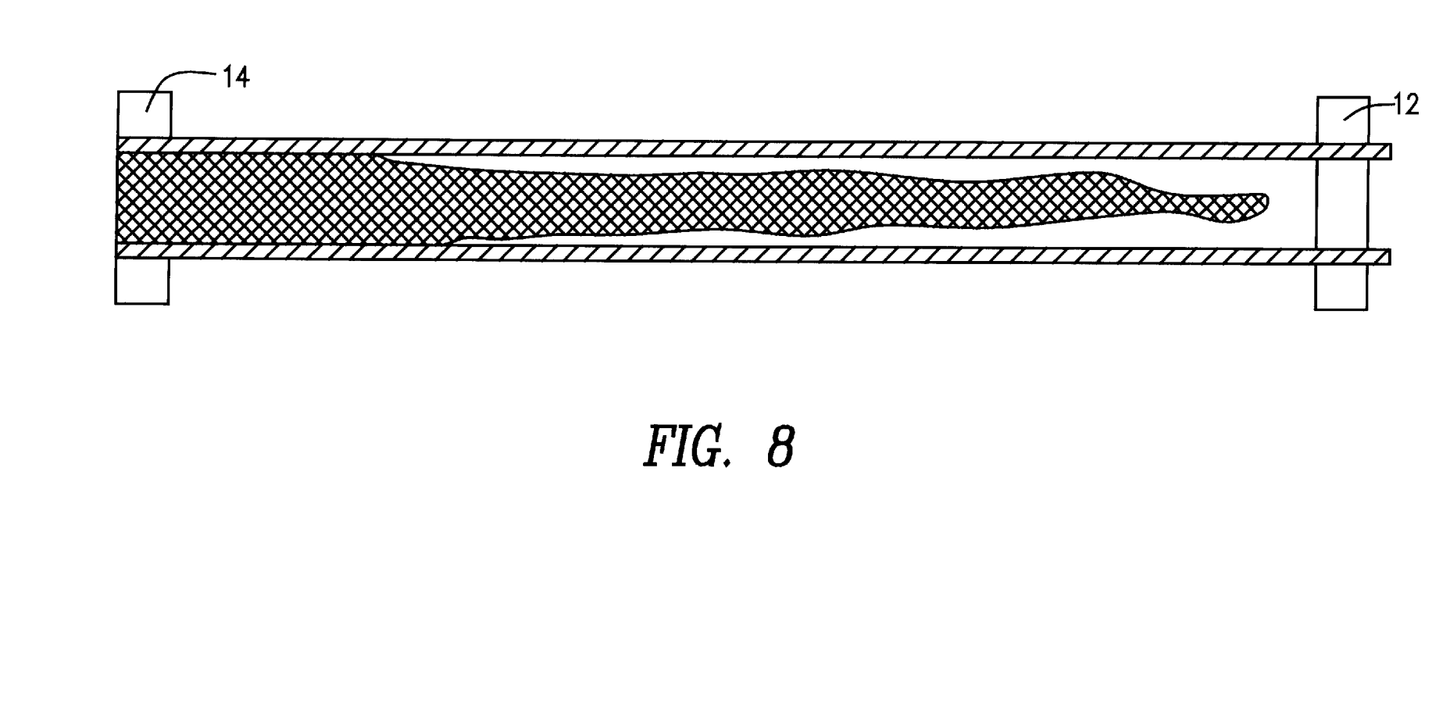
FIG. 8 is a drawing of the cross section of the ice slabs that form when heat transfer fluid flows in only one direction through the plates of the heat exchange assembly during the discharge cycle of a thermal storage system that uses water and ice as the storage medium.

The second effect that reduces the rate at which the thermal storage system can provide cooling is caused by the non-uniform melting of the planar slabs of ice that form between the plates. FIG. 8 shows the cross-sectional shape of a typical ice slab after the thermal storage system is approximately one-quarter discharged. The non-uniformity of the ice slab prevents it from rotating to make contact with the bottom of the plate that is above it. This reduces the heat transfer between the ice and the heat transfer fluid.

The non-uniformity of the ice slabs during discharging can be reduced and the thermal storage system can be discharged at a higher rate if the direction of the flow of heat transfer fluid is periodically reversed. This can be done by providing remotely controlled valves in the circuit that deliver the heat transfer fluid to the thermal storage system. The valves (not shown) are first controlled so that the heat transfer fluid first enters the heat exchange assembly through the pipe that is shown as the inlet 12 in FIG. 1 and leaves through outlet 14. After a period of between 5 to 30 minutes, the valves are then switched so that the heat transfer fluid enters the heat exchange assembly through the pipe that had been the outlet 14 and leaves through the pipe that had been the inlet 12.

Figure 9:
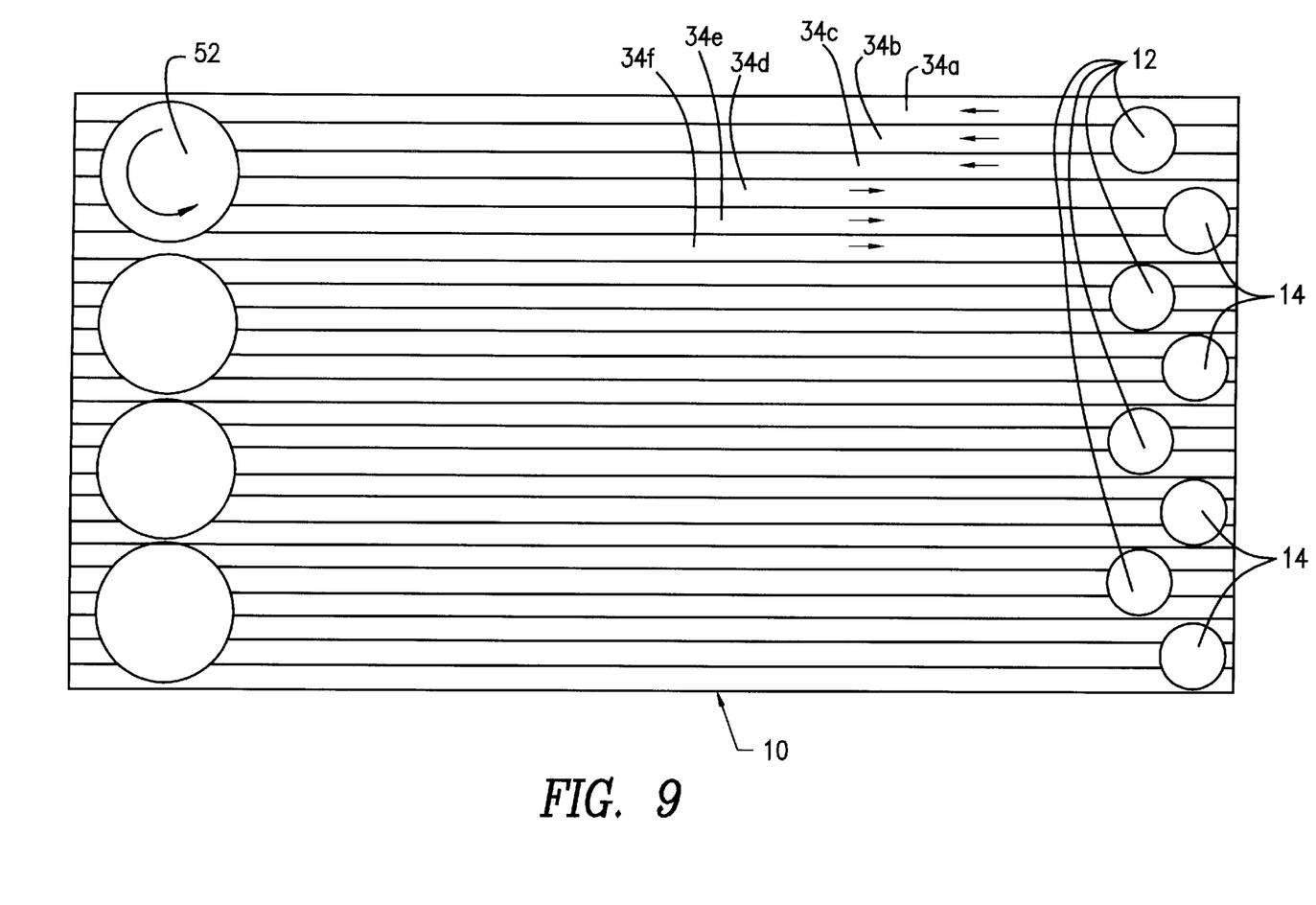
FIG. 9 is a schematic top view of another embodiment of a plate having multiple flow paths, regions where the flow can turn 180° and multiple inlets and outlets through which heat transfer fluid can enter and exit the plate.

A second approach to reducing or eliminating the impediment to heat transfer that may be caused by the non-uniform melting of the ice slabs that form between the plates 10 of the heat exchange assembly 8 is to use multiple inlets 12 and outlets 14 through which the heat transfer fluid enters and leaves the plates. The most effective implementation of this approach is shown in FIG. 9. As shown in FIG. 9, a multiple of inlets 12 and outlets 14 are provided so that the heat transfer fluid enters one set of channels 34a, 34b, 34c within the plate 10, flows to the opposite end of the plate, turns in a circular cut-out 52, which may optionally be covered by a cover 54 (See FIG. 5) and flows in an adjacent set of channels 34d, 34e, 34f towards the outlet 14. In this flow arrangement, the slab of ice will maintain an almost constant thickness as it melts. This will allow the top of the ice slab to maintain good contact with the bottom of the plate that is above it.

In one embodiment of the invention, the edges of plates 10 are fixedly secured to the container 6 by thermal fusion, water-insoluble adhesives or the like. The securing of the plates 10 to the container 6 provides support for the weight and pressure developed by the energy storage medium in the thermal storage system 2. This reduces the external support that must be provided to prevent the container from deforming under the weight and pressure of the energy storage medium. It also reduces the weight and cost of the thermal storage system.

When the energy storage medium is ice and water, fixedly securing the edges of plates 10 to the container 6 also prevents the heat exchange assembly 8 from being pushed upward in the container by the buoyancy force of the ice as the ice melts. If the edges of the plates are not secured to the container another means must be used to prevent the heat exchange assembly 8 from moving upward as the ice melts.

Figure 2:
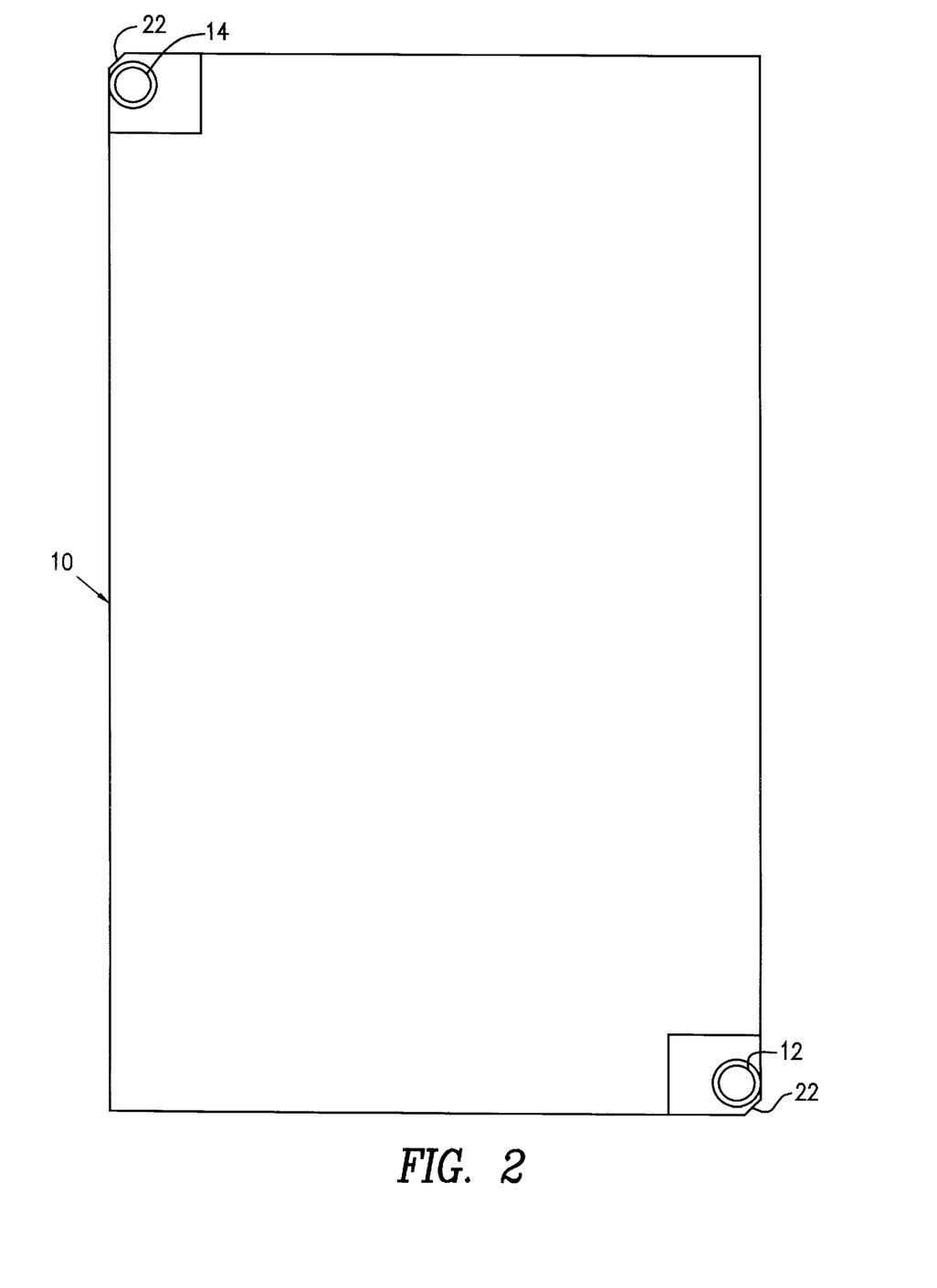
FIG. 2 is a schematic top view of a plate with corner notches that facilitate the introduction of an energy storage medium into the container of the thermal storage system.

However, if the plates 10 are secured to the container 6, provisions must be made for introducing the energy storage medium into the container. Referring again to FIG. 2, each plate 10 of the heat exchange assembly 8 can be made with two corner notches 22. The edges of these corner notches would not be secured to the container. The heat transfer medium would be introduced into the container through one of the notches and the air that would be displaced from the container would leave through the other notch. In a thermal storage system that used either tilted or curved plates to remove trapped air bubbles, the air bubbles can be directed towards one or both of the corner notches. The corner notches 22 would then provide a path for the air bubbles to rise to the free surface of the storage medium.

If the plates 10 are curved, it is not practical to secure all of the edges to the container. When outward opposing forces are applied to opposite edges of a curved plate, if any part of the plate lies outside of the plane through which the forces act, the plates will flatten and lengthen. If this occurs, the plates will not be effective at preventing the container from deforming under the weight and pressure of the energy storage medium. In general, rectangular plates that are curved only in one direction will have two opposing edges that can be secured to the container and two that cannot. Rectangular plates that have a compound curvature (i.e., curve in more than one direction) cannot be secured to the container on any of their edges.

If the plates 10 are flat but tilted, all of the edges can be readily secured to the container only if the container is similarly tilted so that the walls of the container are perpendicular to the plates.

If the heat exchange assembly has corner notches and ice is the storage medium, it is important that the ice that forms in the corner notches does not prevent the slabs of ice that form between the plates 10 from moving upward against the bottom of the plates as the thermal energy system is discharged. It is therefore preferred to locate the notches in regions of the plate where the ice first melts.

Figure 3:
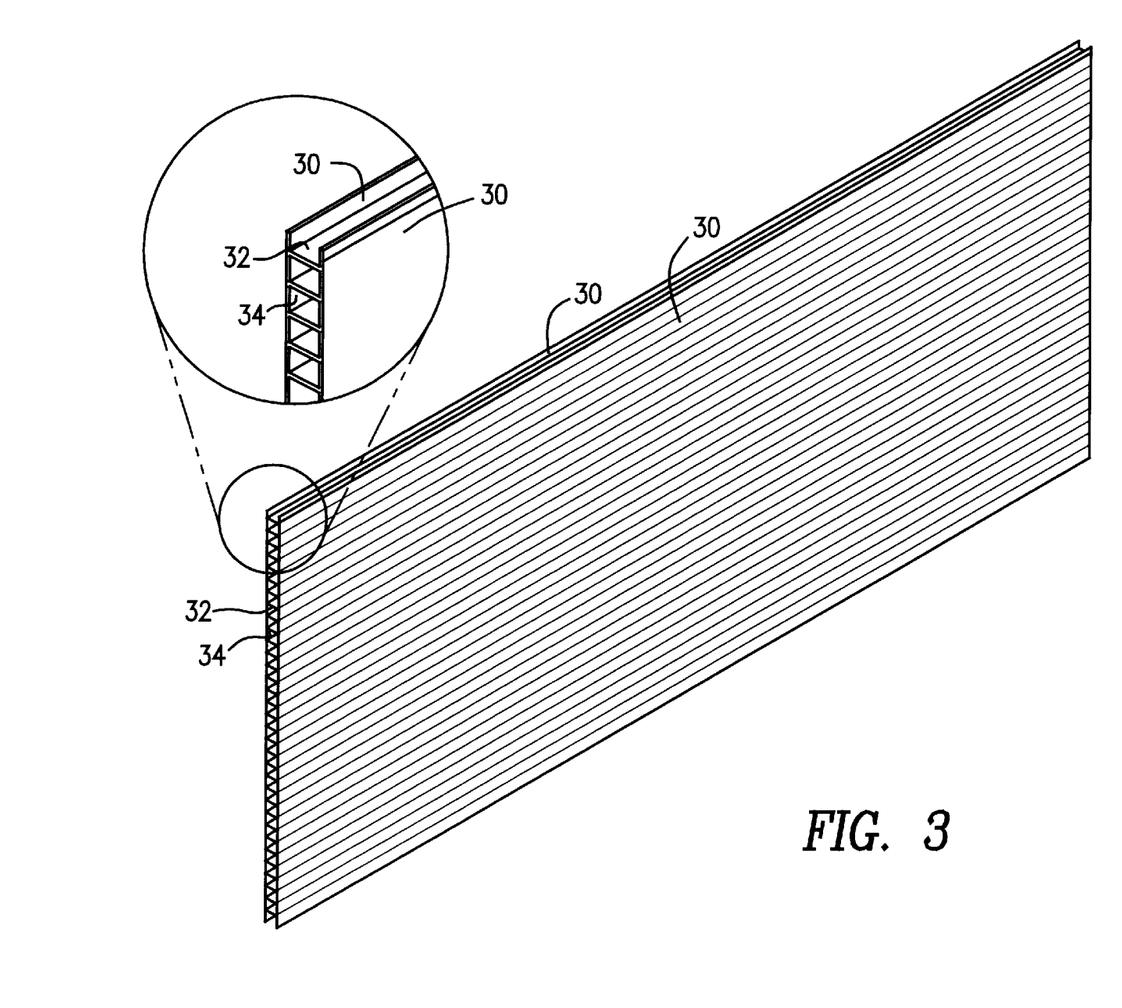
FIG. 3 is a perspective view of a plate with multiple channels in the form of profile board used in a heat exchanger employed in the present invention.

Further details of the heat exchange assembly employed in the present invention and in particular the profile board construction used therein is shown with reference to FIG. 3. Referring to FIG. 3, each plate 10 has outer walls 30 spaced apart by a plurality of internal ribs or webs 32. Each pair of adjacent ribs 32 define a channel 34 therebetween. The construction of the profile board is known including the manner in which the board is extruded.

Figure 4:
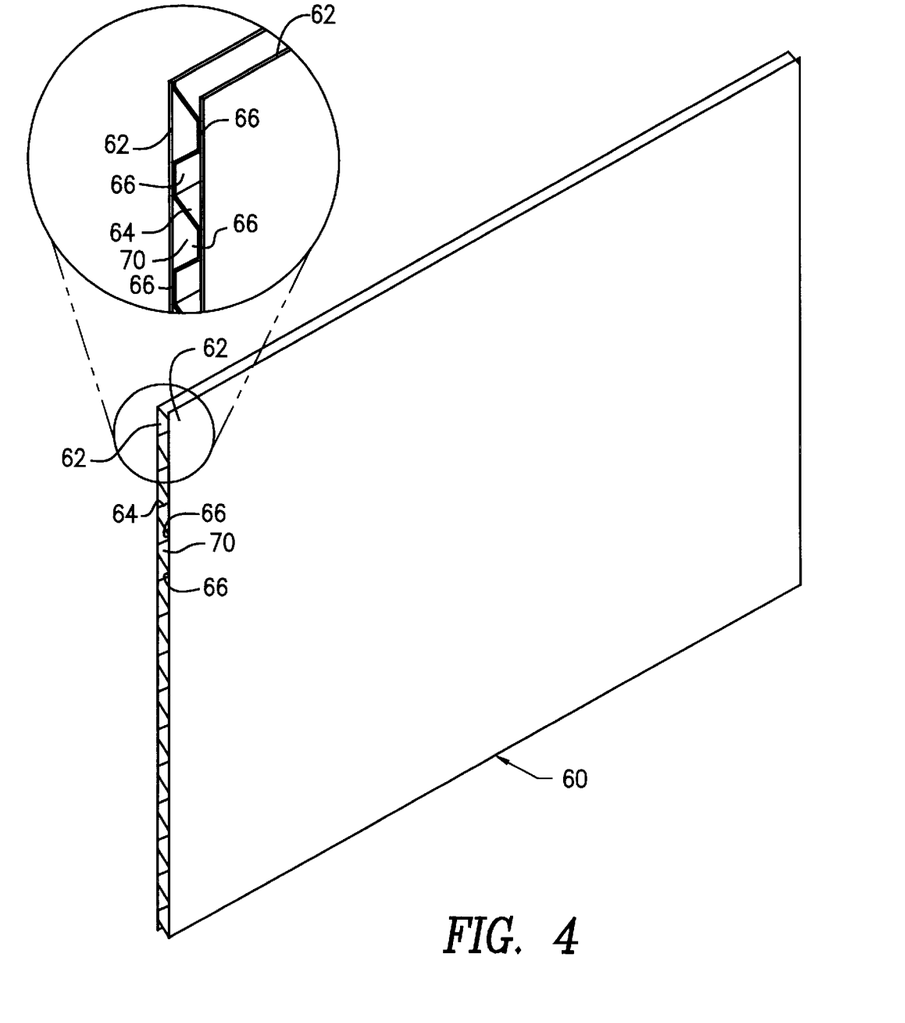
FIG. 4 is a perspective view of a plate with multiple channels in the form of corrugated board used in the heat exchanger.

A board that functions like profile board can be prepared by bonding three thin sheets of plastic or metal together, as is done with corrugated boards. Referring specifically to FIG. 4, a corrugated board 60 includes spaced apart flat plates 62 having therebetween a corrugated shaped board 64 defined by spaced-apart peaks 66. In a preferred form of the embodiment the peaks 66 of each board 64 are attached to the underside of adjacent plate 62. The region between the spaced apart peaks 66 of each board 64 define channels 70 for the flow of the heat transfer fluid as previously described for the profile board embodiment of FIG. 3.

Figure 4A:
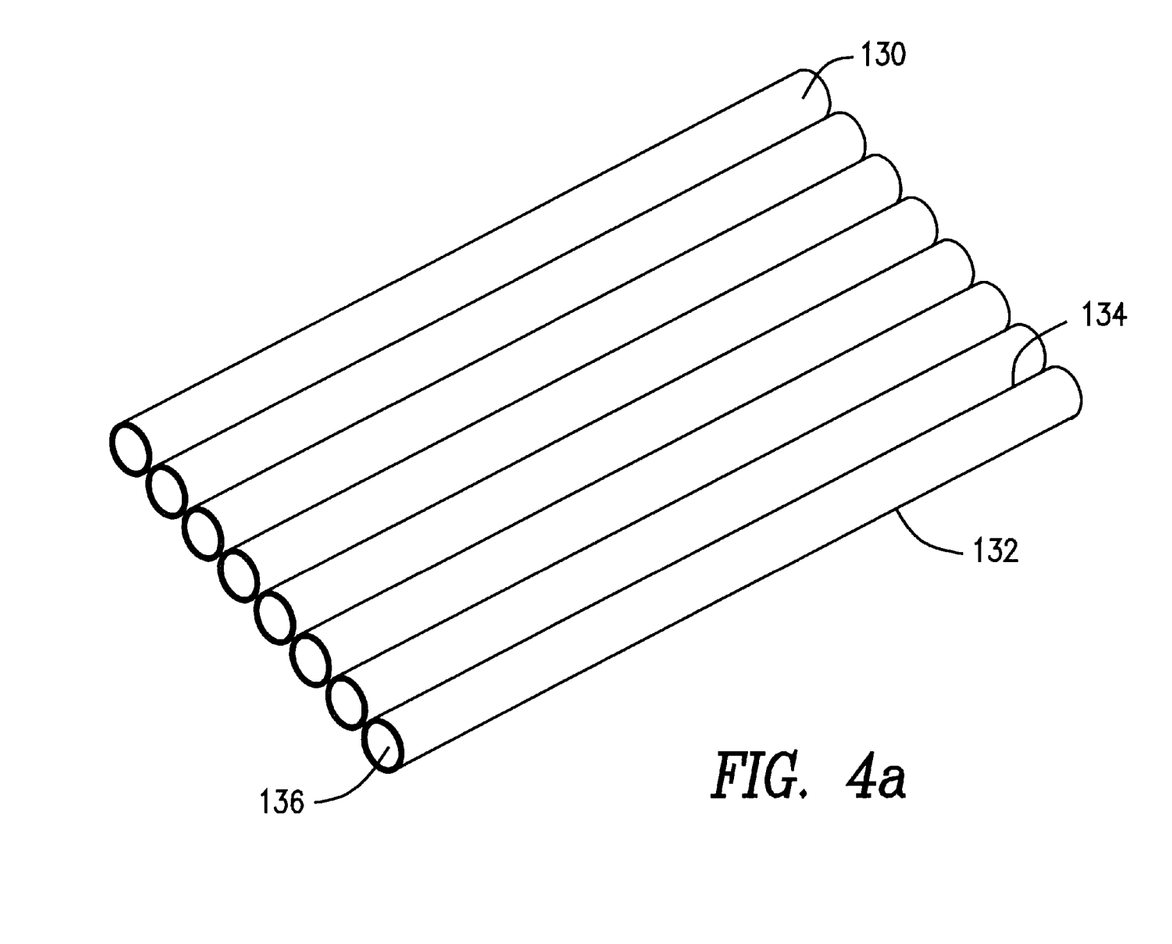
FIG. 4a is a perspective view of a plate with multiple channels formed from individual tubes that are joined along their length.

It is also possible to produce a board that functions like profile board by extruding a series of tubes (i.e. a tube sheet) that are joined along their length, as is shown in FIG. 4a. As shown in FIG. 4a, a plurality of tubes 130 are attached along their respective lengths 132 by an extrusion process to provide a connection 134 along said lengths. Each tube 130 defines a channel 136 having a substantially circular cross section. Since the channels 136 in a tube sheet have a circular cross section, they will distort less when a large pressure difference exists between the inside and outside of the channels.

However, it will be more difficult to attach the inlet tube and outlet tube 16 to the tube sheet because the surface of the sheet is not flat. Similarly, if the plates 10 use either (1) covers 54 to seal the cutouts 52 where the flow within the plates turns (See FIG. 5), (2) triangular inserts 84 for turning the flow (See FIG. 6), or (3) separate end pieces 90 (See FIG. 7) for turning the flow, it will be more difficult to attach these covers 54, inserts 84 and end pieces 90 to a tube sheet since its surfaces are not flat. Applicant has found that a plastic tube sheet can be vacuum formed locally in the regions where an attachment is to be made so that the surface of the sheet is flat. This greatly simplifies welding or fusing the attachment to the plate and improves the reliability of the weld or fusion.

It is also possible to produce a board that functions like profile board by thermoforming two or more flat plastic sheets into a shape that will produce internal flow channels when the sheets are joined together. In applications where the plates are not exposed to significant pressure differences between the heat transfer fluid and the energy storage medium, the plates can be formed from very thin, flexible plastic sheets.

Applicant has found that it is difficult to attach the inlet and outlet tubes 16 directly to the outer walls 30 of the plates 10 since the outer walls are very thin and the area of contact between the tube and the wall is small (See FIGS. 1 and 3). The attachment of the tubes 16 to the plates 10 can be facilitated by first bonding a connecting device 18 to the outer wall 30 of the plate 10 as shown in FIG. 1. The connecting device 18 is operatively connected to the face of each plate and has an opening therein that is aligned with the opening of the tube 16 that is attached to it. The connecting device 18 therefore provides a rigid substrate for attachment of the inlet and outlet tubes in flow communication with the plates 10.

Since the connecting device 18 and the tube 16 are preferably made of plastic, they can be made as a single piece using injection molding techniques.

Applicant has discovered that the connecting device 18 as described can be suitably attached to the plate outer wall 30 without adversely affecting the strength or heat transfer characteristics of the plate outer walls. The connecting device can be of any desired shape, but preferably has a shape complimentary to the shape of the face of the plate wall. For example, a flat plate wall preferably has a connecting device 18 which has a substantially flat mating surface attached to the plates 10. Alternatively, if an arcuate plate 10 is employed, a complimentary shaped (i.e. arcuate shape) connecting device 18 is required.

Figure 5:
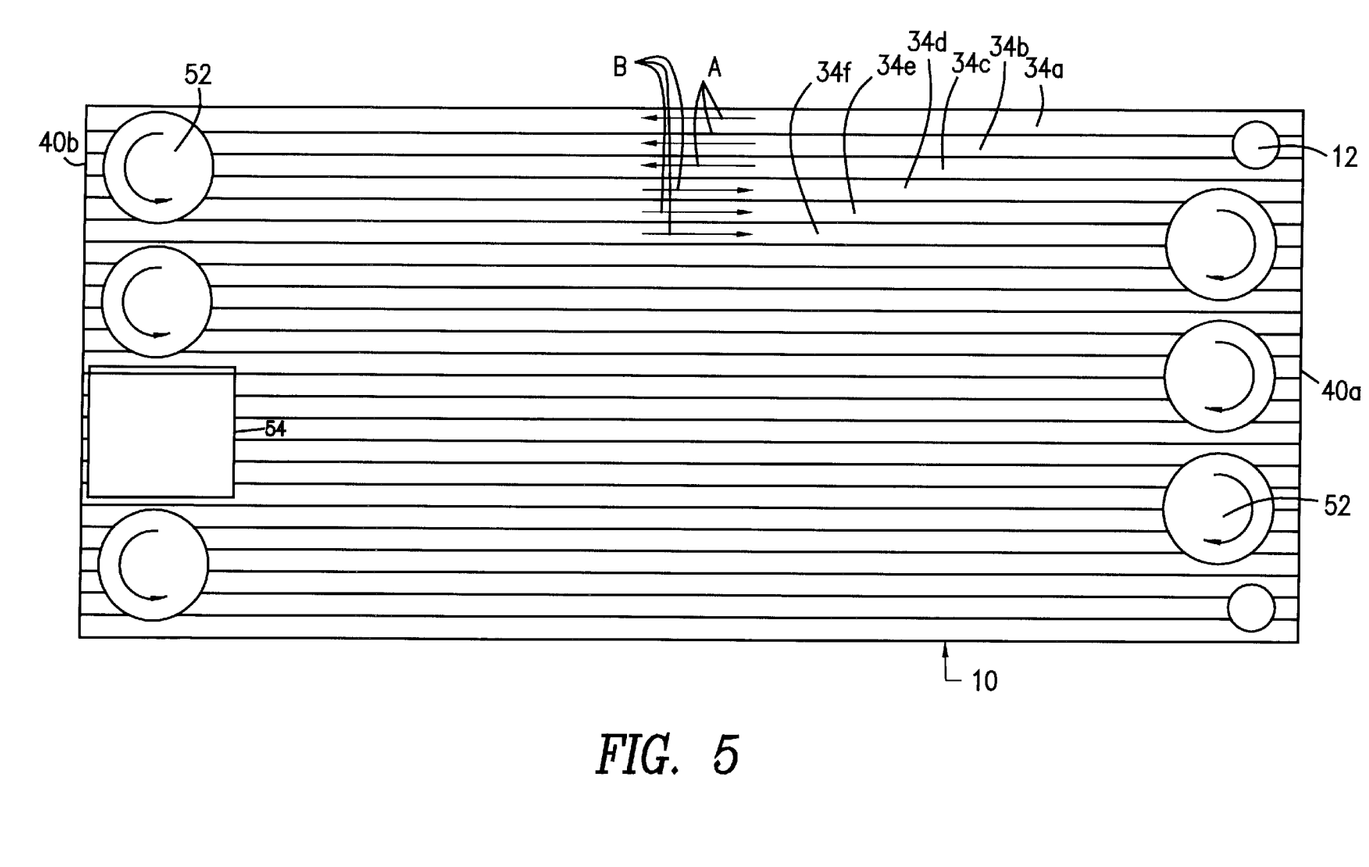
FIG. 5 is a schematic top view of a single plate for use in a heat exchange assembly of the present invention with multiple flow paths for the flow of heat transfer fluid through the channels of the plate and regions that are circular cutouts in the plate where the flow can turn 180°.

The plates 10 of the heat exchanger can be provided with multiple flow paths so that the heat transfer fluid can flow back and forth to improve heat transfer. Referring to FIG. 5 there is shown a plate 10 employing multiple flow paths. The heat transfer fluid enters the plate 10 through the inlet 12 and flows through at least one channel 34 in the direction of arrows "A". As shown specifically in FIG. 5, the heat transfer fluid flows first through a first set of three channels 34a, 34b and 34c. The size of the inlet 12 therefore has a diameter sufficient so that the inlet 12 is in fluid communication with all three channels 34a–34c. It will be understood, however, that a larger or smaller diameter inlet may be selected. If the diameter of the inlet 12 is increased, the inlet will intersect a greater number of channels thereby increasing the amount of the heat transfer fluid which enters the plate 10.

The ends 40a and 40b of each of the channels 34a–34c on the inlet side of the plate 10 are sealed by heat sealing, filler or the like so that all of the heat transfer fluid moves through the channels 34a–34c in the direction of the arrows "A". Accordingly, none of the heat transfer fluid can leave the channels 34a–34c through the respective ends 40a, 40b and become intermixed with the energy storage medium.

As the heat transfer fluid flows through the channels 34a–34c from the inlet 12 to the respective ends 40 thereof, it is caused to change direction and flow in the reverse direction through a second set of channels, 34d, 34e and 34f. The reversal of the flow direction is accomplished by cutouts 52 provided at the ends 40a and 40b of the plate 10.

The shape of the cutouts 52 may vary so long as the cutout provides adequate turning area for the flow so that large pressure drops are avoided. In FIG. 5 the cutouts 52 are circular having a diameter sufficient to receive the heat transfer fluid from at least one, preferable at least two channels (three channels 34a–34c are illustrated) and to direct the heat transfer fluid in the reverse direction indicated by the arrows "B" through at least one channel (three channels 34d–34f are illustrated). As previously explained, the ends 40a and 40b are sealed so that the heat transfer fluid upon entering the cutouts 52 from channels 34a–34c is caused to reverse direction by 180° and flow through the next series of channels (i.e. 34d–34f) in the direction of the arrows "B" thereby providing multiple passes of the heat transfer fluid through the plates. Multiple first and second sets of channels within the plates may be chosen to provide for multiple changes of direction of the heat transfer fluid as it flows through the plates as best shown in FIG. 5.

To prevent the heat transfer fluid from exiting the top and/or the bottom ends of the cutout 52, there are provided respective covers 54 made of plastic or the like over each of the cutouts 52. Referring to FIG. 5 for illustrative purposes only a single cover 54 is shown over one of the cutouts.

Each plate 10 is provided with a sufficient number of cutouts 52 so that the heat transfer fluid flows back and forth through the plate 10 from the inlet 12 to the outlet 14 and eventually out of the heat exchange assembly 8.

Other embodiments of the heat exchange assembly are shown and described in U.S. Pat. No. 5,638,900 issued Jun. 17, 1997, incorporated herein by reference.

When the pressure of the heat transfer fluid within the plates 10 is either significantly higher or lower than the pressure of the energy storage medium, the covers 54 for the cutouts 52 must be reinforced so that they do not bulge either inward or outward. When there is a significant pressure difference between the heat transfer fluid and the energy storage medium, it is preferable to make the turning region in the plates 10 by first cutting out a section of the plate and then filling the cutout with an insert of profile board or similar material that matches the shape of the cutout, but has internal channels that permit the heat transfer fluid to turn 180°. The joints between the inserts and the plate must be sealed to prevent the heat transfer fluid from escaping from the plates. This sealing can be done with a pressure sensitive or thermal sensitive tape, by welding the two pieces together, or by thermally fusing a very thin film over the joints.

Figure 6:
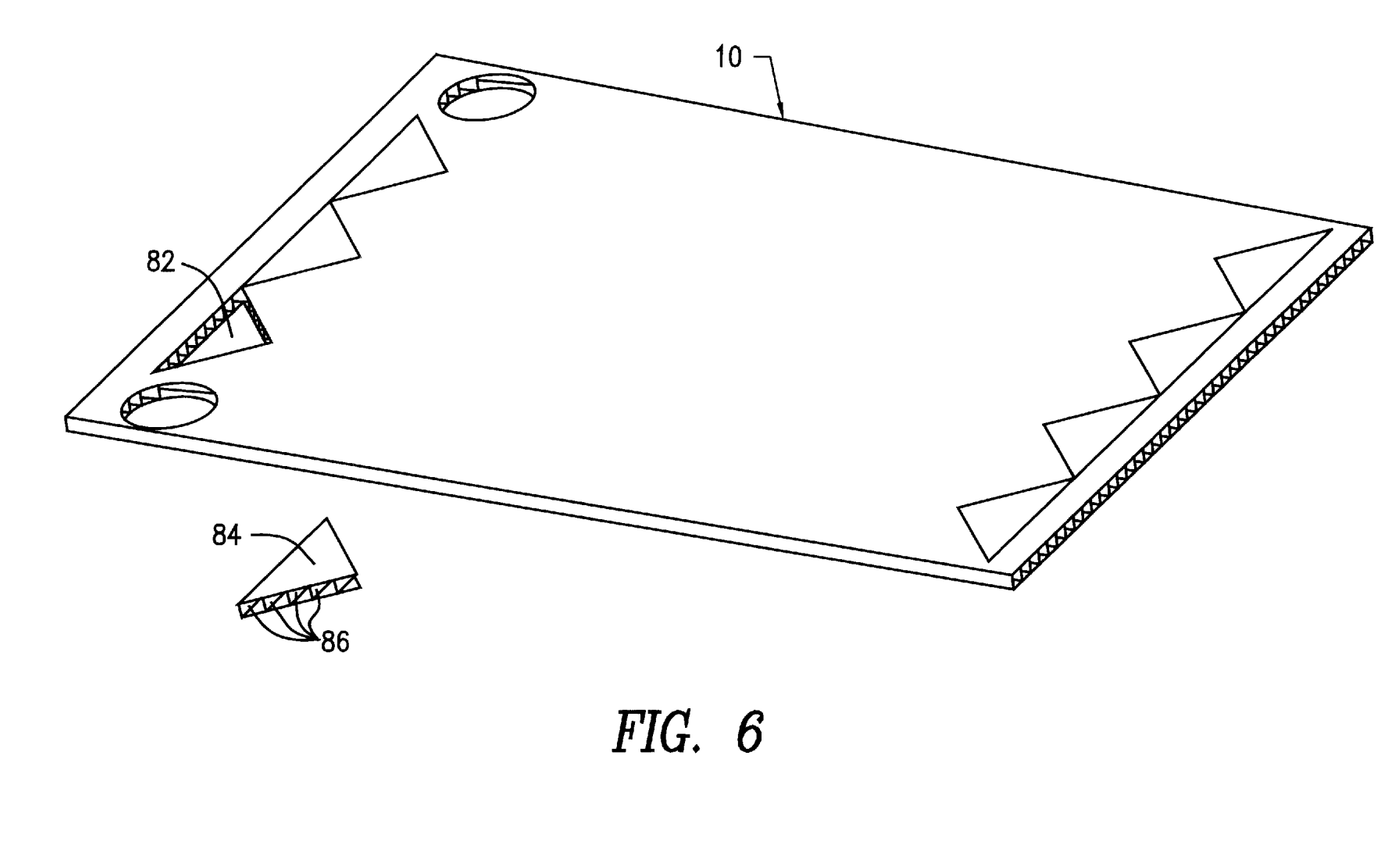
FIG. 6 is a perspective view of a single plate for use in a heat exchange assembly of the present invention with multiple flow paths for the flow of heat transfer fluid through the channels of the plate and regions that are triangular cutouts with similarly shaped inserts that can support the pressure forces in the cutout region.

Referring to FIG. 6, the plate 10 (e.g. profile board) has a triangular shaped cutout 82 removed from the plate 10. The cutout 82 is provided with an insert 84 or the like to provide a series of channels 86 which enable the heat transfer fluid to turn 180° and travel back along the length of the plate 10. Plates with internal passages that use an insert 84 in their turning regions can be applied to heat exchangers that are used in applications other than thermal storage systems, e.g., single-plate solar collectors, fluid coolers, liquid-to-air and liquid-to-liquid heat exchangers, desiccant absorbers, and absorbers and evaporators in absorption chillers.

Figure 7:
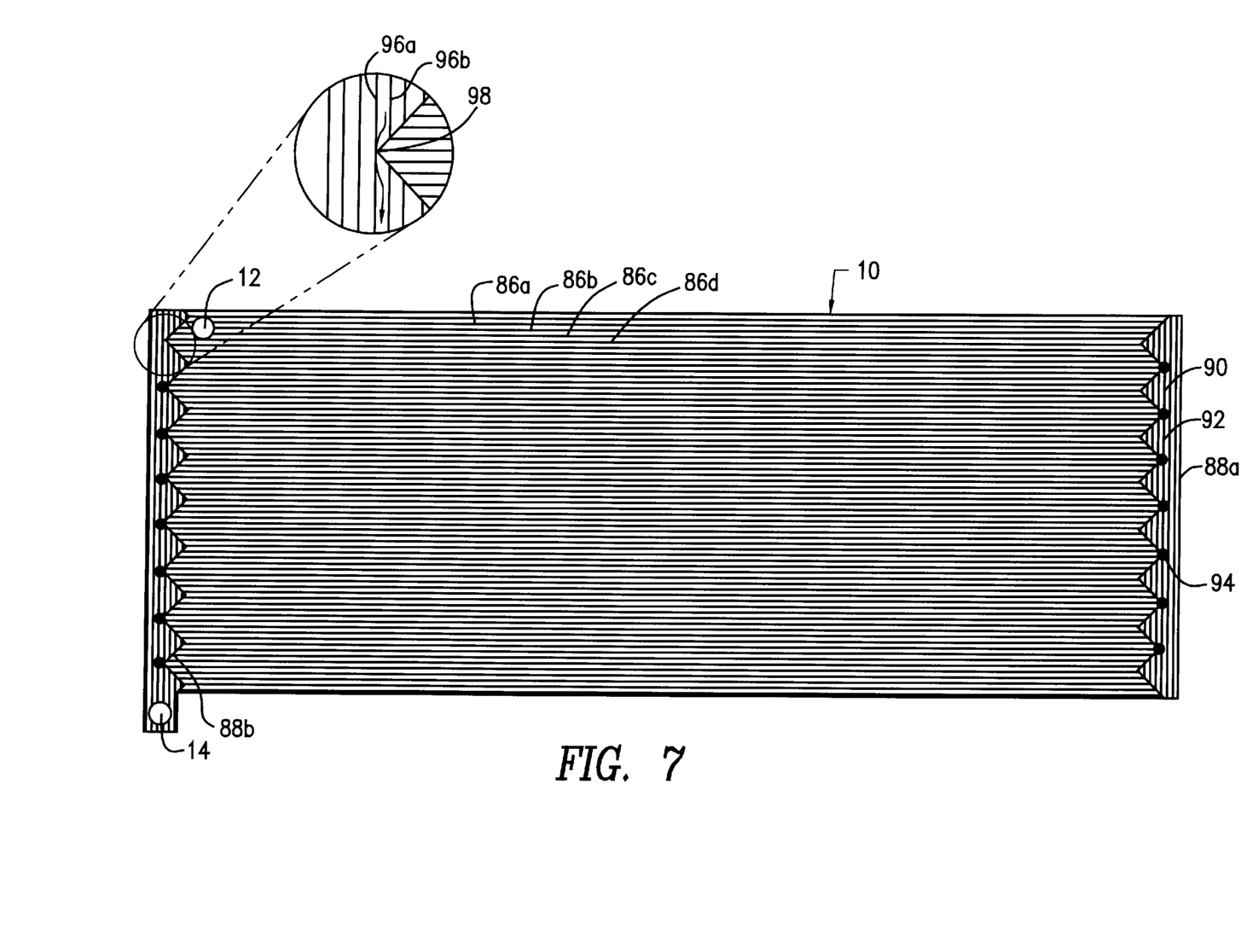
FIG. 7 is a schematic top view of another embodiment of a plate having multiple flow paths and regions where the flow can turn 180° that are provided by separate pieces of profile board that are attached to the ends of the plate, the pieces of profile board at the ends having channels that are perpendicular to those in the plate.

The use of inserts 84 will complicate the manufacture of the plates 10, since the individual inserts must be placed in the cutouts 82, and joints between inserts and the plates must be sealed. As a preferred alternative to using inserts, FIG. 7 shows a plate design that uses saw-tooth shaped pieces of profile board to turn the flow 180° from one series of channels to the next neighboring series of channels. The ends 88a, 88b of plate 10 are cut in a saw-tooth shape. Referring to FIG. 7, the saw-tooth cut must be made so that each series of channels with the heat transfer fluid flowing in the same direction (e.g., channels 86a, 86b, 86c and 86d) are intersected by a common edge of the saw-tooth cut. The cut should preferably intersect the channels at a 45° angle, although other angles are possible. End pieces 90 are attached to the ends 88a, 88b of the plate 10 by either running a bead of adhesive over the joint; welding or gluing a thin sheet over the joint; or directly welding the end piece 90 to the plate 10 along the entire length of the joint. The end pieces 90 can be made from the same material that is used to make the plate. The end pieces 90 should have the identical saw-tooth shape as the ends of the plate so that the end pieces nest with the plate with minimal spaces between the plate and the end pieces. The end pieces 90 should have internal channels 92 that run perpendicular to the channels 86 in the plate.

As shown in FIG. 7, the inlet 12 and outlet 14 cutouts can be made in either the plate or the end piece. FIG. 7 shows the inlet 12 made in the plate and the outlet 14 made in the end piece. But it should be recognized that both the inlet or the outlet cutouts can be made in the plate or in the end piece.

Because of imperfections and inaccuracies that are inescapable when manufacturing plates with saw-tooth end regions, a path may inadvertently be created through which a small fraction of the heat transfer fluid that should be turning 180° can bypass the set of channels that it should be flowing into. This will most commonly happen if the peak 98 of the saw-tooth cut terminates within the space between two webs 96a, 96b. Heat transfer fluid can be prevented from bypassing a set of channels by plugging or otherwise sealing the channel in the end piece 90 that intersects the peak 98 of the saw-tooth cut. The applicant has successfully used drops of hot-melt adhesive to create plugs 94 that prevent the heat transfer fluid from bypassing a set of channels. It is also recognized that the bypassing of heat transfer fluid can be prevented by spot melting, welding or crushing the plate 10 and the end pieces 90 at the locations where the peaks of the plate nest with the valleys of the end piece.

Plates that use saw-tooth end pieces 90 as turning regions for the heat transfer fluid can be applied to heat exchangers that are used in applications other than thermal storage systems, e.g., single-plate solar collectors, fluid coolers, liquid-to-air and liquid-to-liquid heat exchangers, desiccant absorbers, and absorbers and evaporators in absorption chillers.

Figure 10:
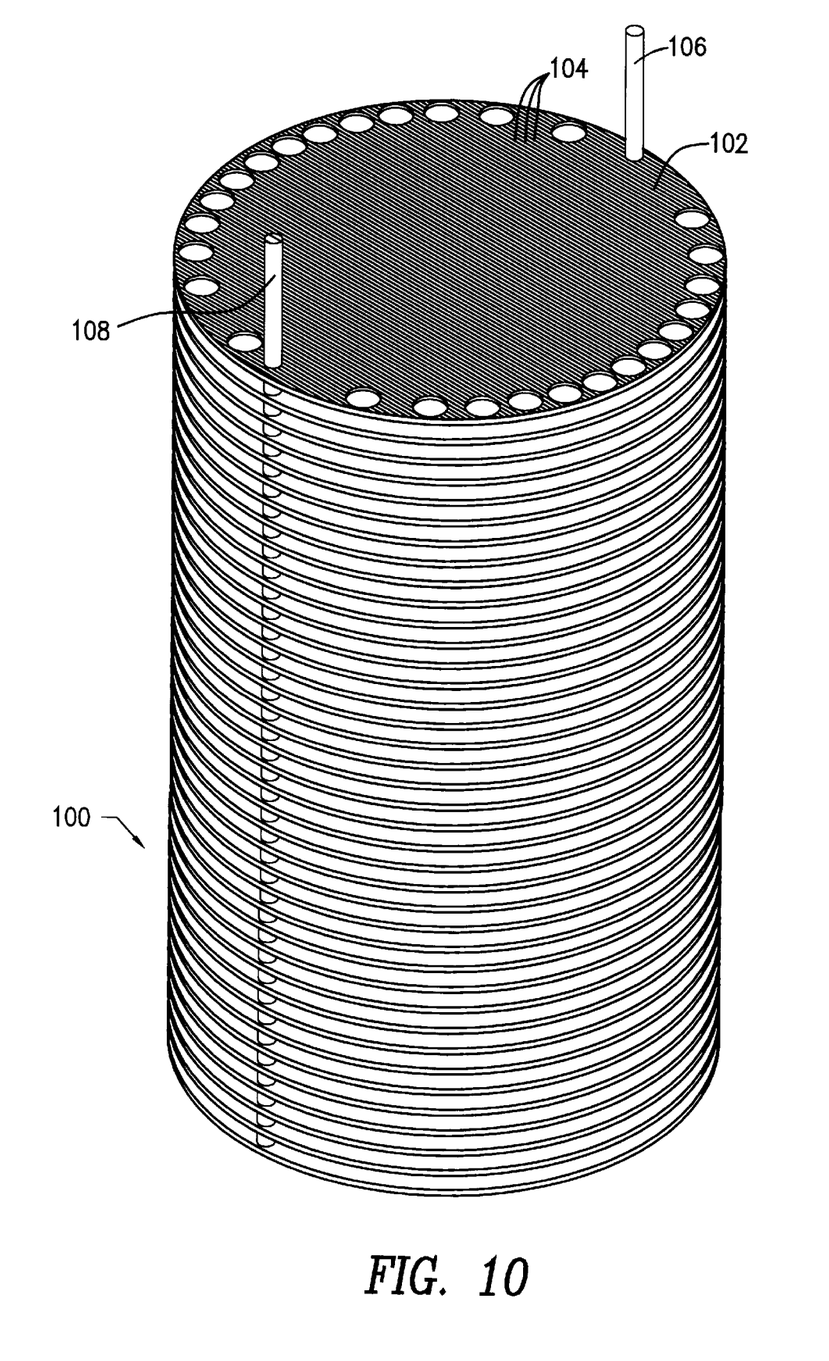
FIG. 10 is a perspective view of another embodiment of a thermal storage system in accordance with the present invention employing flat circular plates for the circulation of a heat transfer fluid.

As previously indicated, the plate or plates employed in the heat exchange assembly can have a variety of shapes. Referring to FIG. 10, there is shown an embodiment of the invention wherein a heat exchange assembly 100 is comprised of a plurality of circular plates 102 with each plate comprised of multiple channels 104 for providing a flow path for a heat transfer fluid such as ethylene glycol. Access to the plates 102 is through an inlet 106 and an outlet 108.

As with the heat exchange assembly 8 shown in FIG. 1, the heat exchange assembly 100 that is comprised of circular plates would be inserted in a container (not shown) that contained the energy storage medium. An important advantage for the heat exchange assembly 100 that is comprised of circular plates, however, is that it could effectively use a cylindrical container, which would not deform as easily under the pressure and weight of the energy storage medium as would a rectangular container.

Each of the plates 102 is preferably made of profile board the construction of which was previously described in connection with FIG. 5 with modifications to accommodate the circular shape of the plates 102. The ends of the channels 104 are sealed to keep the heat transfer fluid therein.

The plates 102 can be provided with multiple flow paths so that the heat transfer fluid can flow back and forth to improve heat transfer. Reversal of the direction of flow of the heat transfer fluid may, for example, be accomplished by cutouts as described previously in connection with FIG. 5 or by cutouts with inserts as shown and described in connection with FIG. 6.

EXAMPLE I

A conventional ice thermal storage system with a capacity of 100 ton-hours that uses a plastic tubular heat exchanger will have the following characteristics:

tube outer diameter: 0.5"

tube wall thickness: 0.0625"

total length of tubing: 15,000 feet storage volume: 850 gallons tube material: polyethylene weight of tube material:

1,150 lb raw material cost: $1,500 (@ $0.10/ft. of tube)

An ice thermal storage system in accordance with the present invention with the same 100 ton-hours capacity and the same ratio of water volume to heat exchanger area made from profile board may have the following characteristics:

board length: 84"

board width: 48"

board thickness: 0.157"

distance between webs: 0.197"

thickness of outer skins: 0.011"

thickness of webs: 0.014"

board material: polypropylene total area of profile board: 1,200 square feet weight of profile board: 217 lb raw material cost: $192 (@ $0.16/square foot)

Furthermore, if the conventional thermal storage system with the tubular heat exchanger uses a conventional cylindrical tank made from polyethylene that is 0.5" thick, this tank will weight 389 pounds. If a thermal storage system in accordance with the present invention with a profile-board heat exchanger is made with ⅛" sheets of polypropylene fused directly to the edges of the profile board to form the container 6 that holds the ice, the weight of the resulting container will be only 47 pounds.

Accordingly, thermal storage systems made in accordance with the present invention on air conditioning systems employing the same are light weight and cost effective compared to conventional systems.

EXAMPLE II

The Applicant has made plates with saw-tooth end pieces as shown in FIG. 7. The plates were made from polypropylene profile board manufactured by Coroplast, Dallas, Tex., that had a nominal thickness of 2 mm. The plates were 60 cm long (in the direction of the internal channels) and 20 cm wide. The cuts at the ends of the plate intersected the channels at 45°, with each edge of the saw-tooth intersecting 11 channels. Before joining the end pieces to the plates, small drops of a hot-melt adhesive were placed at the internal intersections of the 45° cuts (location 98 in FIG. 7) so that the heat transfer fluid would not by-pass some of the channels in the plates A 10 mil sheet of polypropylene was used to cover and seal the joint between the end pieces and the plate. The polypropylene sheet was cut so that it had a saw-tooth shape that matched the cuts in the end pieces and the plate. The width of each leg of the saw-tooth polypropylene sheet was 17 mm. An impulse welder for plastic sheets that produced a saw-tooth weld was used to joint the polypropylene sheet to the end pieces and the plate. Rather than attempt to have the weld exactly overlap the saw-tooth joint, two saw-tooth welds, each 2 to 3 mm wide, were made on each side of the joint. Thus, the welds were parallel to each other and parallel to the joint between the end piece and the plate.

As shown in FIG. 7, one inlet and one outlet hole were cut in the plate. The inlet and outlet holes intersected 11 channels. The inlet and outlet holes were positioned so that there were between three and four channels along each side of the plate that were not in flow communication with the other channels in the plate. Thus, in the event that the channel were not exactly parallel to the edge of the plate, it would still be unlikely that heat transfer fluid could leak out from the side of the plate.

The plate, endpiece and polypropylene sheet were thermally crushed and fused together along a 3 mm wide by 25 mm region at the four locations where the joint between the end piece and the plate intersected the side of the plate. This operation insured that heat transfer fluid would not leak out of the side of the plate where the end piece met the plate.

What is claimed is:

1. A thermal storage system comprising:
   a) a container having at least two walls;
   b) at least one plate within the container, each plate having a length and width that is greater than its thickness and having multiple internal channels therein for the flow of a heat transfer fluid in a first plane, and each plate having two or more opposed edges which are securely attached to the walls of the container so that the forces imposed on the walls of the container by the energy storage medium are at least partly supported by the at least one plate,
   c) at least one inlet and outlet on each plate for the heat transfer fluid, said inlet and outlet being parallel to or angled with respect to the first plane;
   d) conduits that connect the inlets of neighboring plates and conduits that connect the outlets of neighboring plates so that the heat transfer fluid travels in parallel paths through the plates; and
   e) an energy storage medium within the container adapted to exchange energy with the heat transfer fluid flowing within the plates.

2. The thermal storage system of claim 1 wherein the plates are made from profile board, corrugated board, tube sheets or thermoformed sheets and said plates have sealed end portions.

3. The thermal storage system of claim 1 further comprising connecting means operatively connected to the face of each plate and having an opening therein for receiving the inlet or outlet.

4. The thermal storage system or claim 3 where the plates are made from tube sheets and the regions of the tube sheets where the connecting means are attached are flattened.

5. The thermal storage system of claim 2 wherein the region around the inlet and the outlet is flattened.

6. The thermal storage system of claim 3 wherein the connecting means is integral with the conduit that delivers heat transfer fluid into or out of the plate.

7. The thermal storage system of claim 2 in which the plate or plates are provided with a means for transferring the heat transfer fluid from a first set of channels to a second set of channels in a manner in which a flow direction of the heat transfer fluid is reversed as the liquid flows from the first to the second set of channels.

8. The thermal storage system of claim 7 comprising a plurality of first and second sets of channels.

9. The thermal storage system of claim 7 wherein the transfer means within each plate comprises cutouts positioned at opposed ends of the plates, said cutouts provided with cover plates to prevent the heat transfer fluid from leaving the plane of the plate and thereby causing the heat transfer fluid to change its direction of flow.

10. The thermal storage system of claim 7 wherein the plates are made from corrugated board and the transfer means within each plate comprises cutouts positioned at opposed ends of the plates and made only in the central corrugated sheet of the board, the two uncut outer sheets of the board preventing the heat transfer fluid from leaving the plane of the plate and thereby causing the heat transfer fluid to change its direction of flow.

11. The thermal storage systems of claim 9 wherein the cutouts have a circular, oval, semicircular, triangular or rectangular shape.

12. The thermal storage system of claim 8 wherein the plates are substantially horizontal.

13. The thermal storage system of claim 12 wherein the plates are notched to provide a space between the container wall and the plates for both introducing energy storage media into the container and purging air from the container.

14. The thermal storage system of claim 7 wherein the plates are angled from the horizontal by an angle of less than 45°.

15. The thermal storage system of claim 2 wherein the plates are curved and placed within the container with their concave side facing upward.

16. The thermal storage system of claim 7 wherein each plate has a plurality of inlets and outlets.

17. A thermal storage system comprising a container, a heat exchange assembly through which a heat transfer fluid flows, and an energy storage medium, both the heat exchange assembly and the energy storage medium being within the container, and means periodically reversing the direction of the flow of the heat transfer fluid into and out of the thermal storage system.

18. A plate for use in a heat exchange assembly:
   comprising multiple channels therein for the flow of a heat transfer fluid in a first plane,
   with cutouts at the ends of the plate where the heat transfer fluid turns 180°, and
   with inserts placed in the cutouts that permit the heat transfer fluid to turn, the inserts having webs that connect the front and back walls of the inserts so that the walls do not significantly deflect when pressure is applied to them.

19. A plate for use in a heat exchange assembly:
   comprising multiple channels therein for the flow of a heat transfer fluid in a first plane,
   with saw-tooth cuts at the ends of the plate,
   end pieces that have multiple channels for the flow of a heat transfer fluid that are perpendicular to the channels in the plate, the sides of the end pieces being cut to a saw-tooth pattern that matches the cuts at the ends of the plates, with the end pieces joined and sealed to the ends of the plate so that heat transfer fluid can flow from one set of channels in the plate, through channels in the end piece and into a second set of channels in the plate, thus turning 180°, with means for joining and sealing the end pieces to the end of the plates so that heat transfer fluid does not leak out of the plate.

20. The plate of claim 18 where the multiple channels have a circular cross section and the regions of the plate where the cutouts are made and inserts are placed are made flat.

21. The plate of claim 19 where the multiple channels have a circular cross section and the regions of the plate where the end pieces are attached are made flat.

22. The thermal storage system of claim 1 wherein the plates comprise walls having a thickness of no more than about 30 mils.

23. A thermal storage system comprising
  a) a container; and
  b) at least one plate of claim 19 within the container; and
  c) an energy storage medium within the container adapted to exchange energy with the heat transfer fluid flowing through at least one plate.

* * * * *